United States Patent
Jiang

(10) Patent No.: US 10,622,893 B2
(45) Date of Patent: Apr. 14, 2020

(54) METHOD AND DEVICE FOR CONTROLLING DC-TO-DC CONVERTER

(71) Applicant: Murata Manufacturing Co., Ltd., Nagaokakyo-shi, Kyoto-fu (JP)

(72) Inventor: Shenggen Jiang, Shanghai (CN)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 16/452,567

(22) Filed: Jun. 26, 2019

(65) Prior Publication Data
US 2020/0014300 A1   Jan. 9, 2020

(30) Foreign Application Priority Data
Jul. 3, 2018   (CN) .......................... 2018 1 0717998

(51) Int. Cl.
*H02M 3/155* (2006.01)
*H02M 3/158* (2006.01)
*H02M 1/00* (2006.01)

(52) U.S. Cl.
CPC ......... *H02M 3/158* (2013.01); *H02M 1/0061* (2013.01); *H02M 2001/0003* (2013.01)

(58) Field of Classification Search
CPC .......... H02M 3/00; H02M 3/02; H02M 3/155; H02M 3/157; H02M 3/158; H02M 1/0061; H02M 2001/0003; H02M 2001/0009; H02M 2001/012
See application file for complete search history.

(56) References Cited

U.S. PATENT DOCUMENTS

| | | | | |
|---|---|---|---|---|
| 6,226,190 B1* | 5/2001 | Balakrishnan | .... | H02M 3/33507 363/21.13 |
| 6,498,461 B1* | 12/2002 | Bucur | .... | H02J 7/0018 320/145 |
| 2004/0257271 A1* | 12/2004 | Jacobson | .... | G01S 7/282 342/175 |
| 2010/0066311 A1* | 3/2010 | Bao | .... | H02J 7/0073 320/162 |
| 2014/0070785 A1* | 3/2014 | Galloway | .... | H02M 3/1582 323/285 |
| 2019/0097441 A1* | 3/2019 | Chen | .... | H02J 7/0026 |

* cited by examiner

*Primary Examiner* — Adolf D Berhane
(74) *Attorney, Agent, or Firm* — Keating & Bennett, LLP

(57) ABSTRACT

A method for controlling a DC-to-DC converter includes detecting an output current and an output voltage of the DC-to-DC converter, controlling the DC-to-DC converter to switch from a voltage loop control mode to a current loop control mode based on a comparison result of the output current with a first current threshold and a comparison result of the output voltage with a first voltage threshold, and reducing a duty ratio of a switch in the DC-to-DC converter by a first predetermined amount based on the output current. A section to which the output current belongs is determined from a plurality of candidate current sections, and a predetermined amount corresponding to the section to which the output current belongs is determined as the first predetermined amount by which the duty ratio of the switch is reduced. Reliability of the DC-to-DC converter may be improved.

18 Claims, 3 Drawing Sheets

```
┌─────────────────────────────────────────────────┐
│ an output current and an output voltage of the  │     S1
│ DC-to-DC converter are detected.                │
└─────────────────────────────────────────────────┘
                        │
                        │
┌─────────────────────────────────────────────────┐
│   the DC-to-DC converter is controlled to       │
│   switch from a voltage loop control mode to    │
│   a current loop control mode based on a        │
│   comparison result of the output current with  │     S2
│   a first current threshold and a comparison    │
│   result of the output voltage with a first     │
│   voltage threshold, and a duty ratio of a      │
│   switch in the DC-to-DC converter is reduced   │
│   by a first predetermined extent based on the  │
│   output current                                │
└─────────────────────────────────────────────────┘
```

METHOD AND DEVICE FOR CONTROLLING DC-TO-DC CONVERTER

CROSS REFERENCE TO RELATED APPLICATIONS

This application claims the benefit of priority to Chinese Patent Application No. 201810717998.5 filed on Jul. 3, 2018. The entire contents of this application are hereby incorporated herein by reference.

BACKGROUND OF THE INVENTION

1. Field of the Invention

The present disclosure generally relates to circuit technology, and more particularly, to a method and device for controlling a Direct Current (DC)-to-DC converter.

2. Description of the Related Art

Conventionally, to prevent overvoltage or overcurrent, a current loop or a voltage loop is generally employed to control component parameters of a DC-to-DC converter. In some solutions, to prevent overvoltage and overcurrent at the same time, a first difference between a target voltage and a feedback voltage during voltage loop control and a second difference between a target current and a feedback current during current loop control are calculated, and a parameter (i.e., voltage or current) corresponding to a smaller one of the first and second differences is selected as an object to be controlled. However, such a solution requires a large amount of computational resources. If an output voltage or an output current suddenly increases sharply, a circuit may be damaged before the calculation is completed. To improve a response speed, in some solutions, when the output current is lower than a rated current, the voltage loop control is employed. As load resistance decreases, the output current increases. When the output current is higher than a current threshold, the current loop control is employed to make the output current be stable.

However, in some cases, the output current or voltage may abruptly change. For example, under the voltage loop control, the DC-to-DC converter maintains an output of 48 V and 5 A. Due to a short circuit, the output current is abruptly changed to 80 A, while a preset current threshold at which the current loop control should be employed is 10 A. In this case, the voltage loop control is switched to the current loop control. The output current of 80 A can be controlled under the current loop for a period of time to reach 10 A. During the period, a load will be in a high-voltage state of 10 A to 80 A, which may cause a damage to a power module.

Therefore, a new control method and device is needed to improve reliability of a DC-to-DC converter.

SUMMARY OF THE INVENTION

Preferred embodiments of the present invention provide methods and devices for controlling a DC-to-DC converter, which improves reliability of the DC-to-DC converter.

In a preferred embodiment of the present invention, a method for controlling a DC-to-DC converter is provided, including detecting an output current and an output voltage of the DC-to-DC converter; and controlling the DC-to-DC converter to switch from a voltage loop control mode to a current loop control mode based on a comparison result of the output current with a first current threshold and a comparison result of the output voltage with a first voltage threshold, and reducing a duty ratio of a switch in the DC-to-DC converter by a first predetermined amount based on the output current, wherein reducing the duty ratio of the switch in the DC-to-DC converter by the first predetermined amount based on the output current includes determining, from a plurality of candidate current sections, a section to which the output current belongs; and determining a predetermined amount corresponding to the section to which the output current belongs as the first predetermined amount by which the duty ratio of the switch is reduced, wherein the plurality of candidate current sections are continuous sections in which a current ranges from low to high, and a predetermined amount corresponding to a latter section in the plurality of candidate current sections is greater than a predetermined amount corresponding to a former section in the plurality of candidate current sections.

In some preferred embodiments of the present invention, controlling the DC-to-DC converter to switch from the voltage loop control mode to the current loop control mode based on the comparison result of the output current with the first current threshold and the comparison result of the output voltage with the first voltage threshold includes, if the output current is higher than the first current threshold and the output voltage is lower than the first voltage threshold, controlling the DC-to-DC converter to switch from the voltage loop control mode to the current loop control mode.

In some preferred embodiments of the present invention, the method further includes controlling the DC-to-DC converter to switch from the current loop control mode to the voltage loop control mode based on a comparison result of the output current with a second current threshold or a comparison result of the output voltage with a second voltage threshold.

In some preferred embodiments of the present invention, controlling the DC-to-DC converter to switch from the current loop control mode to the voltage loop control mode based on the comparison result of the output current with the second current threshold or the comparison result of the output voltage with the second voltage threshold includes, if the output current is lower than the second current threshold, controlling the DC-to-DC converter to switch from the current loop control mode to the voltage loop control mode.

In some preferred embodiments of the present invention, controlling the DC-to-DC converter to switch from the current loop control mode to the voltage loop control mode based on the comparison result of the output current with the second current threshold or the comparison result of the output voltage with the second voltage threshold includes, if the output voltage is higher than the second voltage threshold, controlling the DC-to-DC converter to switch from the current loop control mode to the voltage loop control mode.

In some preferred embodiments of the present invention, the voltage loop control mode includes a constant voltage mode and a constant power mode, and the current loop control mode includes a constant current mode.

In some preferred embodiments of the present invention, the first voltage threshold is lower than a ratio of a target power of the constant power mode to a target current of the constant current mode.

In some preferred embodiments of the present invention, the second voltage threshold is higher than a ratio of a target power of the constant power mode to a target current of the constant current mode.

In a preferred embodiment of the present invention, a device for controlling a DC-to-DC converter is provided, including a detecting circuitry that detects an output current and an output voltage of the DC-to-DC converter; and a controlling circuitry that controls the DC-to-DC converter to switch from a voltage loop control mode to a current loop control mode based on a comparison result of the output current with a first current threshold and a comparison result of the output voltage with a first voltage threshold, and reduces a duty ratio of a switch in the DC-to-DC converter by a first predetermined amount based on the output current, wherein the controlling circuitry reducing the duty ratio of the switch in the DC-to-DC converter by the first predetermined amount based on the output current includes determining, from a plurality of candidate current sections, a section to which the output current belongs; and determining a predetermined amount corresponding to the section to which the output current belongs as the first predetermined amount by which the duty ratio of the switch is reduced, wherein the plurality of candidate current sections are continuous sections in which a current ranges from low to high, and a predetermined amount corresponding to a latter section in the plurality of candidate current sections is greater than a predetermined amount corresponding to a former section in the plurality of candidate current sections.

In some preferred embodiments of the present invention, the controlling circuitry, if the output current is higher than the first current threshold and the output voltage is lower than the first voltage threshold, controls the DC-to-DC converter to switch from the voltage loop control mode to the current loop control mode.

In some preferred embodiments of the present invention, the controlling circuitry controls the DC-to-DC converter to switch from the current loop control mode to the voltage loop control mode based on a comparison result of the output current with a second current threshold or a comparison result of the output voltage with a second voltage threshold.

In some preferred embodiments of the present invention, the controlling circuitry, if the output current is lower than the second current threshold, controls the DC-to-DC converter to switch from the current loop control mode to the voltage loop control mode.

In some preferred embodiments of the present invention, the controlling circuitry, if the output voltage is higher than the second voltage threshold, controls the DC-to-DC converter to switch from the current loop control mode to the voltage loop control mode.

In some preferred embodiments of the present invention, the voltage loop control mode includes a constant voltage mode and a constant power mode, and the current loop control mode includes a constant current mode.

In some preferred embodiments of the present invention, the first voltage threshold is lower than a ratio of a target power of the constant power mode to a target current of the constant current mode.

In some preferred embodiments of the present invention, the second voltage threshold is higher than a ratio of a target power of the constant power mode to a target current of the constant current mode.

Preferred embodiments of the present disclosure may provide following advantages. By the methods and devices for controlling a DC-to-DC converter, when the DC-to-DC converter is controlled to switch from a voltage loop control mode to a current loop control mode, a duty ratio of a switch in the DC-to-DC converter is further reduced by a first predetermined amount based on an output current, so that the output current may be reduced to be relatively low to avoid a damage caused by a load being in a high-voltage state for a time period. Besides, not only the output current is compared with a first current threshold, but also an output voltage is compared with a first voltage threshold, and the DC-to-DC converter is controlled to switch from the voltage loop control mode to the current loop control mode based on the comparison, which may prevent circuit components from being damaged by a reverse current on an output inductor which is generated by reducing the duty ratio of the switch in a case that the output current rapidly increases in a short time, but the high current remains for only a very short time. Therefore, by the methods and devices for controlling the DC-to-DC converter provided in preferred embodiments of the present disclosure, reliability of the DC-to-DC converter may be improved.

Further, if the output current is higher than the first current threshold and the output voltage is lower than the first voltage threshold, the DC-to-DC converter is controlled to switch from the voltage loop control mode to the current loop control mode. From above, the DC-to-DC converter is controlled to switch to the current loop control mode only when the output voltage is lower than the first voltage threshold, which may further prevent circuit components from being damaged by a reverse current on an output inductor which is generated by reducing the duty ratio of the switch in a case that the output current rapidly increases in a short time but the high current remains for only a very short time.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 1:
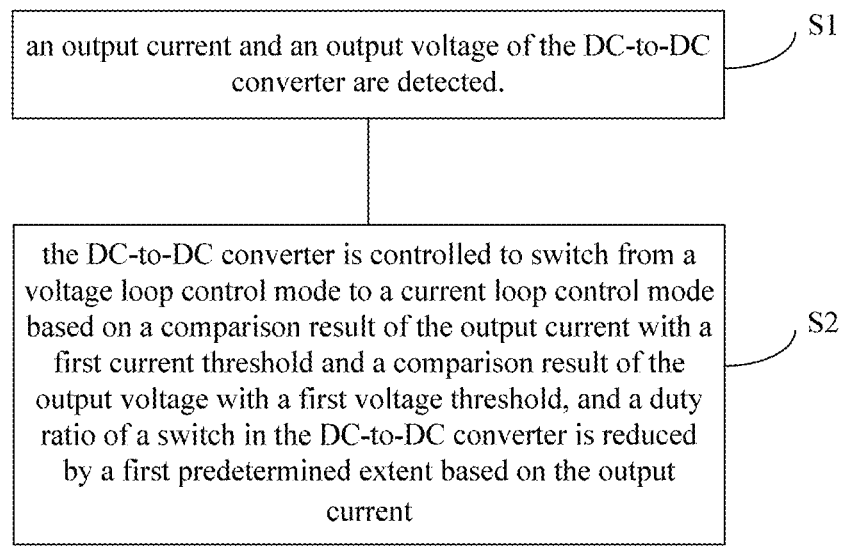
FIG. 1 schematically illustrates a flow chart of a method for controlling a DC-to-DC converter according to a preferred embodiment of the present invention.

As described above, in some cases, an output current or a voltage of a DC-to-DC converter may abruptly change. For example, under a voltage loop control, the DC-to-DC converter maintains an output of 48 V and 5 A. Due to a short circuit, the output current is abruptly changed to 80 A, while a preset current threshold at which a current loop control should be employed is 10 A. In this case, the voltage loop control is switched to the current loop control. The output current of 80 A can be controlled under the current loop for a period of time to reach 10 A. During the period, a load will be in a high-voltage state of 10 A to 80 A, which may cause a damage to a power module.

A preferred embodiment of the present disclosure provides a method for controlling a DC-to-DC converter. The method includes detecting an output current and an output voltage of the DC-to-DC converter; and controlling the DC-to-DC converter to switch from a voltage loop control mode to a current loop control mode based on a comparison result of the output current with a first current threshold and a comparison result of the output voltage with a first voltage threshold, and reducing a duty ratio of a switch in the DC-to-DC converter by a first predetermined amount based on the output current, wherein reducing the duty ratio of the switch in the DC-to-DC converter by the first predetermined amount based on the output current includes determining, from a plurality of candidate current sections, a section to which the output current belongs; and determining a predetermined amount corresponding to the section to which the output current belongs as the first predetermined amount by which the duty ratio of the switch is reduced, wherein the plurality of candidate current sections are continuous sections in which a current ranges from low to high, and a predetermined amount corresponding to a latter section in the plurality of candidate current sections is greater than a predetermined amount corresponding to a former section in the plurality of candidate current sections.

In preferred embodiments of the present disclosure, in consideration of a situation that the output current rapidly increases, when the DC-to-DC converter is controlled to switch from the voltage loop control mode to the current loop control mode, the duty ratio of the switch in the DC-to-DC converter is further reduced by the first predetermined amount based on the output current, so that the output current may be reduced to be relatively low to avoid a damage caused by a load being in a high-voltage state for a time period. Besides, in a case where the output current rapidly increases in a short time but the high current rapidly disappears in a short time, if the DC-to-DC converter is switched to the current loop control mode and the duty ratio of the switch is reduced only based on the output current, a reverse current may be generated on an output inductor in the DC-to-DC converter that can damage circuit components. Therefore, in preferred embodiments of the present disclosure, not only is the output current compared with the first current threshold, but also the output voltage is compared with the first voltage threshold, and the DC-to-DC converter is controlled to switch from the voltage loop control mode to the current loop control mode based on the comparison, which may prevent circuit components from being damaged by a reverse current on an output inductor which is generated by reducing the duty ratio of the switch in a case that the output current rapidly increases in a short time but the high current remains for only a very short time. Therefore, by the methods and devices for controlling the DC-to-DC converter provided in preferred embodiments of the present disclosure, reliability of the DC-to-DC converter may be improved.

FIG. 1 schematically illustrates a flow chart of a method for controlling a DC-to-DC converter according to a preferred embodiment of the present invention. Referring to FIG. 1, the method includes S1 and S2.

In S1, an output current and an output voltage of the DC-to-DC converter are detected.

In S2, the DC-to-DC converter is controlled to switch from a voltage loop control mode to a current loop control mode based on a comparison result of the output current with a first current threshold and a comparison result of the output voltage with a first voltage threshold, and a duty ratio of a switch in the DC-to-DC converter is reduced by a first predetermined amount based on the output current.

The DC-to-DC converter may include any suitable topology, such as a half-bridge topology, a full-bridge topology, a buck topology, a boost topology, or a buck-boost topology. The DC-to-DC converter may be a component of a power module.

Figure 2:
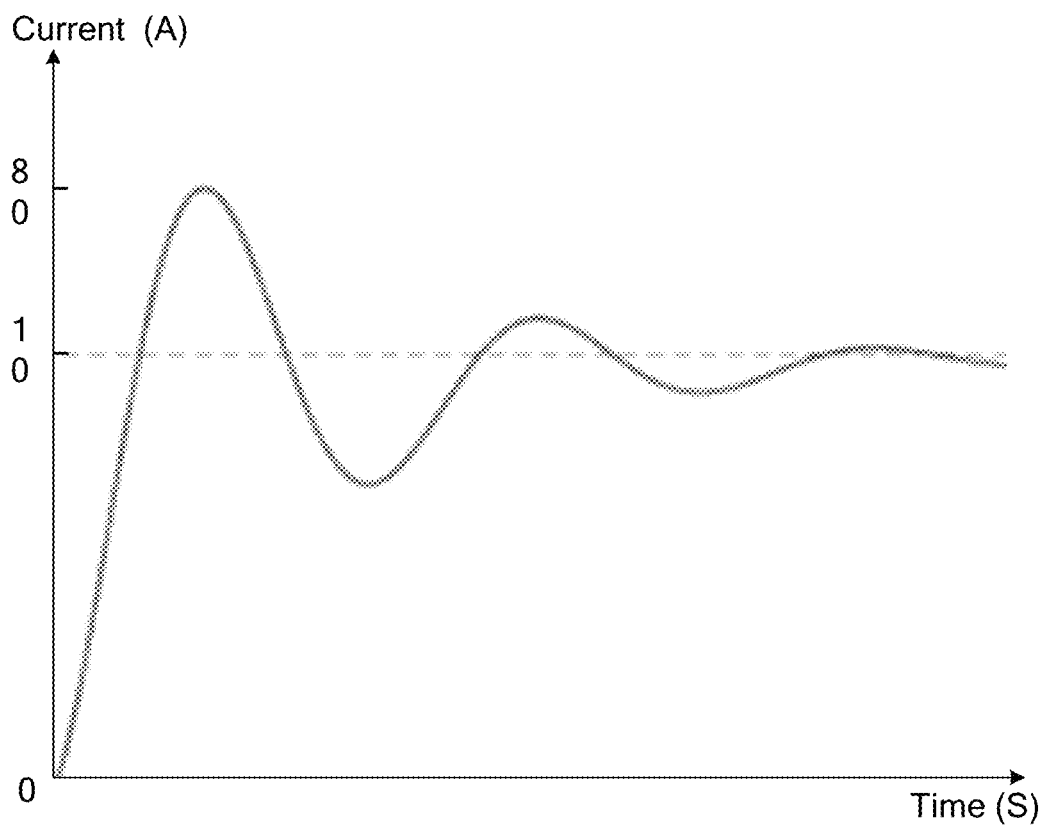
FIG. 2 schematically illustrates an output current waveform of a DC-to-DC converter when there is an abrupt change in current in existing techniques.

FIG. 2 schematically illustrates an output current waveform of a DC-to-DC converter when there is an abrupt change in current in existing techniques. A DC-to-DC converter maintains a stable output voltage under a voltage loop control. Due to a short circuit, an output current is abruptly changed to 80 A, and thus the voltage loop control is switched to a current loop control. However, a preset current threshold at which the current loop control should be employed is 10 A. The output current of 80 A can be controlled under the current loop for a period of time to reach 10 A. During the period, a load will be in a high-voltage state of 10 A to 80 A, which may cause a damage to a power module. Therefore, the existing techniques have not solved the problem of an abrupt change in the output current or voltage, and thus reliability of the DC-to-DC converter is not guaranteed.

In preferred embodiments of the present disclosure, as described in S2, when the DC-to-DC converter is controlled to switch from the voltage loop control mode to the current loop control mode, the duty ratio of the switch in the DC-to-DC converter is further reduced by the first predetermined amount based on the output current, so that the output current may be reduced to be relatively low to avoid any damage caused by a load being in a high-voltage state for a time period.

In some preferred embodiments, reducing the duty ratio of the switch in the DC-to-DC converter by the first predetermined amount based on the output current includes determining, from a plurality of candidate current sections, a section to which the output current belongs; and determining a predetermined amount corresponding to the section to which the output current belongs as the first predetermined amount by which the duty ratio of the switch is reduced, wherein the plurality of candidate current sections are continuous sections in which current ranges from low to high, and a predetermined amount corresponding to a latter section in the plurality of candidate current sections is greater than a predetermined amount corresponding to a former section in the plurality of candidate current sections. That is, the output current has a corresponding relationship with the predetermined amount, and the output currents in different current sections correspond to different predetermined amounts. By changing the duty ratio stepwise, the output current may change continuously, and an abrupt decrease of the output current may be avoided.

Specifically, if the output current is higher than 50 A and lower than or equal to 70 A, the duty ratio of the switch may be adjusted to 1/2 of that before adjusting; if the output current is higher than 70 A and lower than or equal to 100 A, the duty ratio of the switch may be adjusted to 1/8 of that before adjusting; if the output current is higher than 100 A, the duty ratio of the switch may be adjusted to 1/32 of that before adjusting. In this preferred embodiment, the plurality of candidate current sections includes (50 A, 70 A), (70 A, 100 A) and (100 A, ∞). If the duty ratio of the switch before adjusting is D, the predetermined amounts corresponding to the three candidate current sections are 1/2D, 7/8D and 31/32D.

By reducing the duty ratio of the switch in the DC-to-DC converter, the output current or voltage may be timely reduced in case of an abrupt increase in the output current or voltage, so as to prevent a load from being in a high-voltage state for a time period. However, for a case where the output current rapidly increases in a short time but the high current rapidly disappears in a short time, improved solutions are desired.

Figure 3:
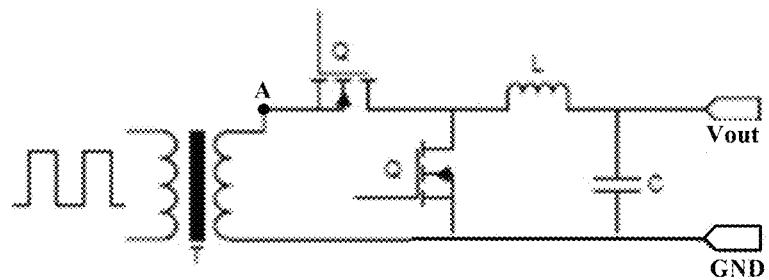
FIG. 3 schematically illustrates a structural diagram of a rectifier circuit in a DC-to-DC converter according to a preferred embodiment of the present invention.

FIG. 3 schematically illustrates a structural diagram of a rectifier circuit in a DC-to-DC converter according to a preferred embodiment of the present invention. Referring to FIG. 3, if a load is short circuited, a current on the load abruptly increases, a control circuit for the rectifier circuit switches a control loop from a voltage loop to a current loop. Additionally, to prevent the load from being in a high-voltage state, a duty ratio of a switch is reduced from D to a predetermined amount, such as D/32. In the moment, a voltage at point A drops significantly to 1/32 of the voltage before adjusting, while a voltage of capacitor C remains unchanged, so that a voltage difference is generated between capacitor C and point A. At this time, an output current has disappeared, and there is also a voltage difference between the capacitor C and the load. If the load recovers from the short circuit in a short time and resistance of the load is high, more current will flow to a branch of the capacitor C and the point A, thus generating a relatively high reverse current on an output inductor L. When a rectifier is turned off, the reverse current will generate a high voltage Vds on the rectifier, which impacts a rectifier switch Q, and may further cause the rectifier switch Q to be damaged.

For the above case where the output current rapidly increases in a short time but the high current rapidly disappears in a short time, preferred embodiments of the present disclosure provide improved solutions. As described in S1 and S2, the output current and the output voltage of the DC-to-DC converter are detected, and the DC-to-DC converter is controlled to switch from the voltage loop control mode to the current loop control mode based on the comparison result of the output current with the first current threshold and the comparison result of the output voltage with the first voltage threshold. Therefore, in a method provided according to a preferred embodiment of the present disclosure, not only the output current is compared with the first current threshold, but also the output voltage is compared with the first voltage threshold, and the DC-to-DC converter is controlled to switch from the voltage loop control mode to the current loop control mode based on the comparison, which may prevent circuit components from being damaged by a reverse current on an output inductor which is generated by reducing the duty ratio of the switch in a case that the output current rapidly increases in a short time but the high current remains for only a quite short time.

In some preferred embodiments of the present invention, controlling the DC-to-DC converter to switch from the voltage loop control mode to the current loop control mode based on the comparison result of the output current with the first current threshold and the comparison result of the output voltage with the first voltage threshold includes, if the output current is higher than the first current threshold and the output voltage is lower than the first voltage threshold, controlling the DC-to-DC converter to switch from the voltage loop control mode to the current loop control mode.

In some preferred embodiments of the present invention, the voltage loop control mode includes a constant voltage mode and a constant power mode, and the current loop control mode includes a constant current mode.

Figure 4:
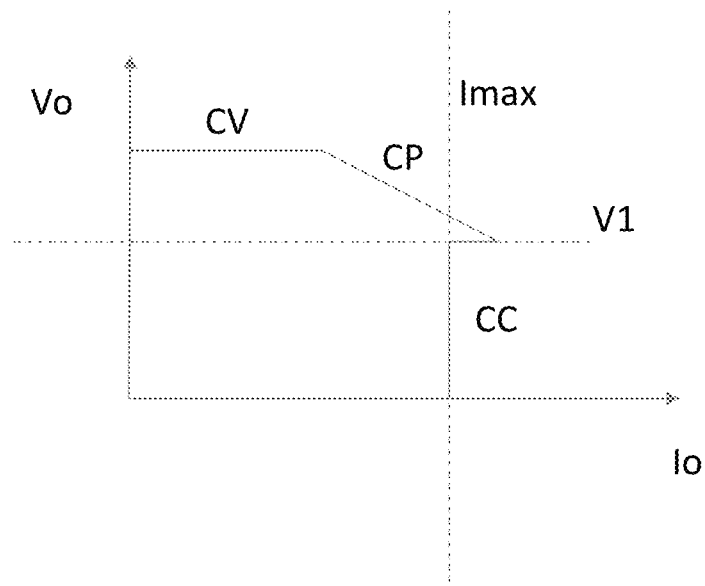
FIG. 4 schematically illustrates changes of an output current and an output voltage during a process that a DC-to-DC converter switches from a constant voltage mode to a constant power mode and further to a constant current mode under the control of a method for controlling the DC-to-DC converter according to a preferred embodiment of the present invention.

FIG. 4 schematically illustrates changes of an output current and an output voltage during a process that a DC-to-DC converter switches from a constant voltage mode to a constant power mode and further to a constant current mode under the control of a method for controlling the DC-to-DC converter according to a preferred embodiment of the present invention.

Referring to FIG. 4, initially, when the output current Io is lower than a rated current, the output of the DC-to-DC converter is controlled by a voltage loop control mode (including the constant voltage mode CV and the constant power mode CP). As load resistance decreases, the output current Io increase. When the output current Io is higher than the first current threshold Imax, different from the existing techniques where the voltage loop control mode is immediately switched to the current loop control mode, in this preferred embodiment, not only is the output current Io compared with the first current threshold Imax, but also the output voltage Vo is compared with the first voltage threshold V1. When the output current Io is higher than the first current threshold Imax and the output voltage Vo is lower than the first voltage threshold V1, the voltage loop control mode is switched to the current loop control mode, which may prevent circuit components from being damaged by a reverse current on an output inductor which is generated by reducing the duty ratio of the switch in a case that the output current rapidly increases in a short time but the high current remains for only a quite short time.

In some preferred embodiments of the present invention, the first voltage threshold V1 is lower than a ratio of a target power at the constant power mode CP to a target current at the constant current mode CC. The target power or current refers to a desired value of a target parameter to be maintained in the corresponding mode.

On one hand, the first voltage threshold V1 cannot be too high. Otherwise, in the case that the output current rapidly increases in a short time but the high current remains for only a quite short time, the voltage loop control mode is still switched to the current loop control mode, which rapidly reduces a duty ratio of a primary side in a circuit, increases a duty ratio of a rectifier transistor in a secondary side, and generates a high reverse current on an inductor, thus causing failure of a power module. On the other hand, the first voltage threshold V1 cannot be too low. Otherwise, when the output current slowly increases and overcurrent occurs, the power module will remain in a CP state in a large range of load overcurrent. Only when, the current continuously increases, and the voltage continuously decreases following V=Pc/I (Pc is the target power in the constant power mode) to be lower than V1, is the power module switched to the current loop control mode. Therefore, if the first voltage threshold V1 is too low, an overcurrent margin design of the power module may be difficult. In some preferred embodiments of the present invention, the first voltage threshold V1 is between about 0.6 and about 0.9 times the ratio of the target power at the constant power mode to the target current at the constant current mode.

From above, a method provided in a preferred embodiment of the present disclosure may not only prevent an overcurrent or an overvoltage when the output current slowly increases, but may also prevent an overcurrent or an overvoltage caused by an abrupt increase in the output current or voltage which lasts for a relatively long time period by reducing the duty ratio of the switch in the DC-to-DC converter, and an overcurrent or an overvoltage caused by an abrupt increase in the output current or voltage which lasts for a quite short time period by comparing the output current with the first current threshold and comparing the output voltage with the first voltage threshold.

In some preferred embodiments of the present invention, the method further includes controlling the DC-to-DC converter to switch from the current loop control mode to the voltage loop control mode based on a comparison result of the output current with a second current threshold or a comparison result of the output voltage with a second voltage threshold.

In some preferred embodiments of the present invention, controlling the DC-to-DC converter to switch from the current loop control mode to the voltage loop control mode based on the comparison result of the output current with the second current threshold or the comparison result of the output voltage with the second voltage threshold includes, if the output current is lower than the second current threshold, controlling the DC-to-DC converter to switch from the current loop control mode to the voltage loop control mode.

In some preferred embodiments of the present invention, controlling the DC-to-DC converter to switch from the current loop control mode to the voltage loop control mode based on the comparison result of the output current with the second current threshold or the comparison result of the output voltage with the second voltage threshold includes, if the output voltage is higher than the second voltage threshold, controlling the DC-to-DC converter to switch from the current loop control mode to the voltage loop control mode.

The second voltage threshold cannot be too low. Otherwise, the power module can switch to the voltage loop control mode immediately after entering the current loop control mode, which may result in a failure to stabilize the current loop and a frequent switches between the current loop control mode and the voltage loop control mode. In some preferred embodiments, the second voltage threshold is higher than a ratio of a target power in the constant power mode to a target current in the constant current mode, such as being slightly higher than the ratio. In some preferred embodiments, the second voltage threshold is about 1.02 to about 1.2 times, preferably 1.05 times or 1.1 times, the ratio of the target power at the constant power mode to the target current at the constant current mode.

Figure 5:
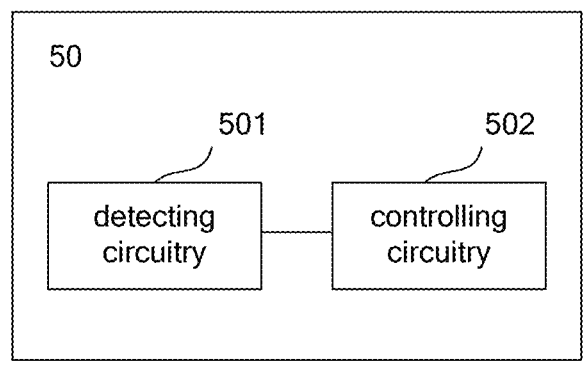
FIG. 5 schematically illustrates a block diagram of a device for controlling a DC-to-DC converter according to a preferred embodiment of the present invention.

Accordingly, a device for controlling a DC-to-DC converter is provided. FIG. 5 schematically illustrates a block diagram of a device for controlling a DC-to-DC converter according to a preferred embodiment of the present invention. The device 50 includes a detecting circuitry 501 that detects an output current and an output voltage of the DC-to-DC converter; and a controlling circuitry 502 that controls the DC-to-DC converter to switch from a voltage loop control mode to a current loop control mode based on a comparison result of the output current with a first current threshold and a comparison result of the output voltage with a first voltage threshold, and that reduces a duty ratio of a switch in the DC-to-DC converter by a first predetermined amount based on the output current, wherein the controlling circuitry 502 reducing the duty ratio of the switch in the DC-to-DC converter by the first predetermined amount based on the output current includes the controlling circuitry 502 determining, from a plurality of candidate current sections, a section to which the output current belongs; and determining a predetermined amount corresponding to the section to which the output current belongs as the first predetermined amount by which the duty ratio of the switch is reduced, wherein the plurality of candidate current sections are continuous sections in which a current ranges from low to high, and a predetermined amount corresponding to a latter section in the plurality of candidate current sections is greater than a predetermined amount corresponding to a former section in the plurality of candidate current sections.

In some preferred embodiments, the controlling circuitry 502, if the output current is higher than the first current threshold and the output voltage is lower than the first voltage threshold, controls the DC-to-DC converter to switch from the voltage loop control mode to the current loop control mode.

In some preferred embodiments, the controlling circuitry 502 controls the DC-to-DC converter to switch from the current loop control mode to the voltage loop control mode based on a comparison result of the output current with a second current threshold or a comparison result of the output voltage with a second voltage threshold.

In some preferred embodiments of the present invention, the controlling circuitry 502, if the output current is lower than the second current threshold, controls the DC-to-DC converter to switch from the current loop control mode to the voltage loop control mode.

In some preferred embodiments of the present invention, the controlling circuitry 502, if the output voltage is higher than the second voltage threshold, controls the DC-to-DC converter to switch from the current loop control mode to the voltage loop control mode.

In some preferred embodiments of the present invention, the voltage loop control mode includes a constant voltage mode and a constant power mode, and the current loop control mode includes a constant current mode.

In some preferred embodiments of the present invention, the first voltage threshold is lower than a ratio of a target power of the constant power mode to a target current of the constant current mode, for example, being about 0.6 to about 0.9 times the ratio.

In some preferred embodiments of the present invention, the second voltage threshold is higher than a ratio of a target power of the constant power mode to a target current of the constant current mode, for example, being about 1.02 to about 1.2 times the ratio, preferably being 1.05 or 1.1 times the ratio.

The control circuitry 50 may be a digital control circuit, an analog control circuit, or a hybrid control circuit. Specifically, the control circuitry 50 may include a digital signal control circuit, a digital signal processor, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for controlling a Direct Current (DC)-to-DC converter, comprising:
    detecting an output current and an output voltage of the DC-to-DC converter; and
    controlling the DC-to-DC converter to switch from a voltage loop control mode to a current loop control mode based on a comparison result of the output current with a first current threshold and a comparison result of the output voltage with a first voltage threshold, and reducing a duty ratio of a switch in the DC-to-DC converter by a first predetermined amount based on the output current; wherein
    reducing the duty ratio of the switch in the DC-to-DC converter by the first predetermined amount based on the output current includes:

determining, from a plurality of candidate current sections, a section to which the output current belongs; and determining a predetermined amount corresponding to the section to which the output current belongs as the first predetermined amount by which the duty ratio of the switch is reduced; wherein the plurality of candidate current sections are continuous sections in which a current ranges from low to high, and a predetermined amount corresponding to a latter section in the plurality of candidate current sections is greater than a predetermined amount corresponding to a former section in the plurality of candidate current sections.

2. The method according to claim 1, wherein controlling the DC-to-DC converter to switch from the voltage loop control mode to the current loop control mode based on the comparison result of the output current with the first current threshold and the comparison result of the output voltage with the first voltage threshold includes:

if the output current is higher than the first current threshold and the output voltage is lower than the first voltage threshold, controlling the DC-to-DC converter to switch from the voltage loop control mode to the current loop control mode.

3. The method according to claim 1, further comprising:
controlling the DC-to-DC converter to switch from the current loop control mode to the voltage loop control mode based on a comparison result of the output current with a second current threshold or a comparison result of the output voltage with a second voltage threshold.

4. The method according to claim 3, wherein controlling the DC-to-DC converter to switch from the current loop control mode to the voltage loop control mode based on the comparison result of the output current with the second current threshold or the comparison result of the output voltage with the second voltage threshold includes:

if the output current is lower than the second current threshold, controlling the DC-to-DC converter to switch from the current loop control mode to the voltage loop control mode.

5. The method according to claim 3, wherein controlling the DC-to-DC converter to switch from the current loop control mode to the voltage loop control mode based on the comparison result of the output current with the second current threshold or the comparison result of the output voltage with the second voltage threshold includes:

if the output voltage is higher than the second voltage threshold, controlling the DC-to-DC converter to switch from the current loop control mode to the voltage loop control mode.

6. The method according to claim 2, wherein the voltage loop control mode includes a constant voltage mode and a constant power mode, and the current loop control mode includes a constant current mode.

7. The method according to claim 5, wherein the voltage loop control mode includes a constant voltage mode and a constant power mode, and the current loop control mode includes a constant current mode.

8. The method according to claim 6, wherein the first voltage threshold is lower than a ratio of a target power of the constant power mode to a target current of the constant current mode.

9. The method according to claim 7, wherein the second voltage threshold is higher than a ratio of a target power of the constant power mode to a target current of the constant current mode.

10. A device for controlling a Direct Current (DC)-to-DC converter, comprising:

a detecting circuitry that detects an output current and an output voltage of the DC-to-DC converter; and a controlling circuitry that controls the DC-to-DC converter to switch from a voltage loop control mode to a current loop control mode based on a comparison result of the output current with a first current threshold and a comparison result of the output voltage with a first voltage threshold, and reduces a duty ratio of a switch in the DC-to-DC converter by a first predetermined amount based on the output current, wherein the controlling circuitry reducing the duty ratio of the switch in the DC-to-DC converter by the first predetermined amount based on the output current includes:

determining, from a plurality of candidate current sections, a section to which the output current belongs; and determining a predetermined amount corresponding to the section to which the output current belongs as the first predetermined amount by which the duty ratio of the switch is reduced; wherein the plurality of candidate current sections are continuous sections in which a current ranges from low to high, and a predetermined amount corresponding to a latter section in the plurality of candidate current sections is greater than a predetermined amount corresponding to a former section in the plurality of candidate current sections.

11. The device according to claim 10, wherein the controlling circuitry, if the output current is higher than the first current threshold and the output voltage is lower than the first voltage threshold, controls the DC-to-DC converter to switch from the voltage loop control mode to the current loop control mode.

12. The device according to claim 10, wherein the controlling circuitry controls the DC-to-DC converter to switch from the current loop control mode to the voltage loop control mode based on a comparison result of the output current with a second current threshold or a comparison result of the output voltage with a second voltage threshold.

13. The device according to claim 12, wherein the controlling circuitry, if the output current is lower than the second current threshold, controls the DC-to-DC converter to switch from the current loop control mode to the voltage loop control mode.

14. The device according to claim 12, wherein the controlling circuitry, if the output voltage is higher than the second voltage threshold, controls the DC-to-DC converter to switch from the current loop control mode to the voltage loop control mode.

15. The device according to claim 11, wherein the voltage loop control mode includes a constant voltage mode and a constant power mode, and the current loop control mode includes a constant current mode.

16. The device according to claim 14, wherein the voltage loop control mode includes a constant voltage mode and a constant power mode, and the current loop control mode includes a constant current mode.

17. The device according to claim 15, wherein the first voltage threshold is lower than a ratio of a target power of the constant power mode to a target current of the constant current mode.

18. The device according to claim 16, wherein the second voltage threshold is higher than a ratio of a target power of the constant power mode to a target current of the constant current mode.

\* \* \* \* \*